United States Patent [19]
George

[11] 3,788,743
[45] Jan. 29, 1974

[54] LASER RECEIVER SYSTEM
[75] Inventor: Nicholas George, Pasadena, Calif.
[73] Assignee: California Institute of Technology, Pasadena, Calif.
[22] Filed: Mar. 2, 1972
[21] Appl. No.: 231,186

[52] U.S. Cl. .................. 356/28, 250/199, 356/112, 356/106 R
[51] Int. Cl. ............................................ G01p 3/36
[58] Field of Search ...... 250/199; 356/5, 28, 106 R, 356/106 RL, 112

[56] References Cited
UNITED STATES PATENTS

| | | | |
|---|---|---|---|
| 3,635,562 | 1/1972 | Catherin | 356/112 |
| 3,431,514 | 3/1969 | Oshman et al. | 250/199 |
| 3,353,896 | 11/1967 | Blattner | 250/199 |

*Primary Examiner*—Benjamin A. Borchelt
*Assistant Examiner*—S. C. Buczinski
*Attorney, Agent, or Firm*—Lindenberg, Freilich & Wasserman

[57] ABSTRACT

A multi-tone gas laser emits light to a receiver. The receiver may be on the same vehicle as the light emitting laser, receiving light reflected from a moving vehicle, or the receiver and laser light transmitter may be moving relative to one another. Thus, the light which is received is modulated as a result of the relative vehicle motion. The receiver comprises a coarse 1 to 100 A. interference filter followed by a Fabry-Perot cavity and photo detector. The length of the Fabry-Perot cavity is chosen roughly equal to the cavity length of the transmitter laser, but with provision for fine fractional wave length control of its length. This length is adjusted until the output derived from a photodetector is peaked. A read-out of the vernier length at that time gives a measurement of the velocity. If the transmitter and receiver are relatively non-accelerating and the light transmitted is modulated then the receiver can intelligently demodulate the received signals.

7 Claims, 3 Drawing Figures

PATENTED JAN 29 1974　　　　　　　　　　　　　　3,788,743

LASER RECEIVER SYSTEM

BACKGROUND OF THE INVENTION

This invention relates to modulated laser light receiving devices and more particularly to improvements therein.

For the speed range from one meter per second to one hundred meters per second, the corresponding range of Doppler shifts from 2MHz to 200MHz. Insofar as current measurement techniques are concerned, one can measure speeds in this range either with a broad band electronic discriminator or perhaps with a tuneable discriminator. Both are possible for this range but neither are simple. However, the speeds ranging from one meter per second to 10,000 meters per second, the Doppler shifts are from 2MHz to 20GHz. This is an impossible range for an electronic discriminator.

OBJECT AND SUMMARY OF THE INVENTION

An object of this invention is to provide a laser doppler system capable of measuring speed ranges not possible of attainment with presently known techniques.

Yet another object of this invention is the provision of a relatively uncomplicated frequency modulated laser light receiver.

Still another object of this invention is the provision of a novel and useful laser receiver.

Yet another object is a useful and sensitive receiver for intelligence — modulated light from mode-locked and cavity-dumped type lasers.

These and other objects of the invention are achieved by providing a laser transmitter which emits light which is received by a receiver. The transmitter and receiver may be on relatively moving platforms or they may be on the same platform with a suitable reflector being carried by a moving vehicle so that the emitted light is reflected back to the receiver. The receiver has a Fabry-Perot cavity with its length chosen roughly equal to the same cavity length of the transmitting laser, but whose position for fine fractional wave lengths is adjustable. A photodetector is positioned to receive the light emitted from the Fabry-Perot cavity. Its output is applied to a display device. In the measurement of approach velocities the length of the Fabray-Perot cavity is adjusted until the display device indicates a maximum. The Fabry-Perot cavity length at this time is representative of the velocity of the moving vehicle. In the sensitive detection of intelligence — modulated, multi-tone laser signals the output of this detector is amplified electronically, and the demodulated envelope is processed as is appropriate for the application, e.g., audio signals would be coupled into a loudspeaker.

The novel features of the invention are set forth with particularity in the appended claims. The invention will best be understood with the following description when read in conjunction with the accompanying drawings.

DESCRIPTION OF THE PREFERRED EMBODIMENT

Figure 1:
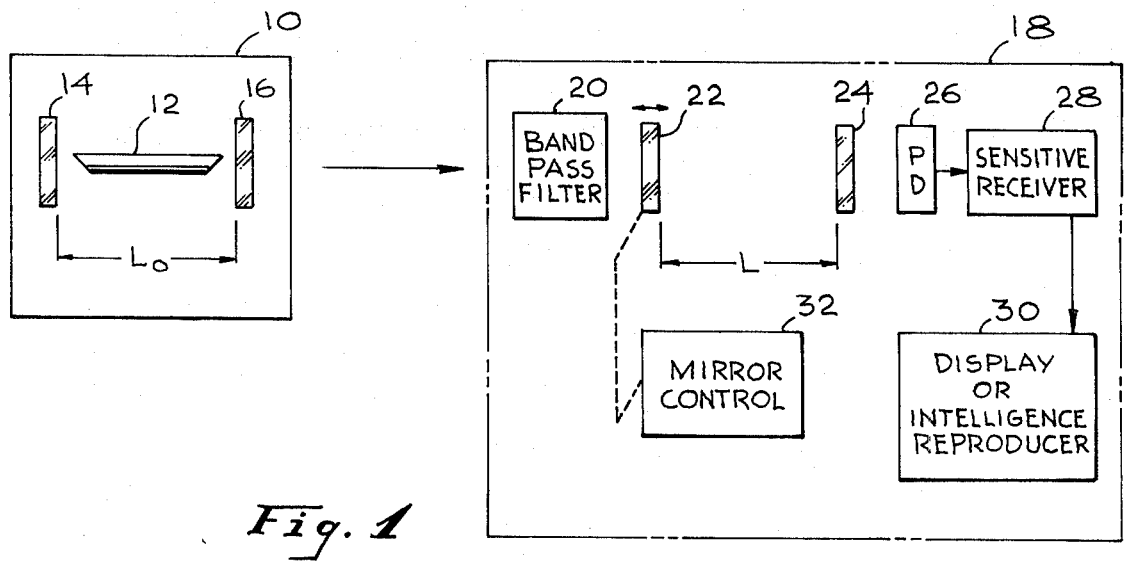
FIG. 1 is a block schematic diagram of an embodiment of the invention.

Referring now to FIG. 1 there may be seen a schematic embodiment of the invention. A transmitter 10 includes a laser 12 placed within a Fabray-Perot cavity, as defined by the spacing $L_0$ between two mirrors respectively 14, 16. The laser is preferably a multi-tone gas laser. Assume that the transmitter is moving with the speed V toward a reciever 18. The reciever includes a band pass interference filter 20, which is a relatively broad band pass, followed by a Fabry-Perot cavity of length L, as defined by the spacing between two mirrors 22, 24. A photodetector 26 receives light passed through the mirror 24 and converts the light into electrical signals. The electrical signals are amplified by a suitable amplification system 28 and are applied to detecting and display circuit 30, such as a cathode ray tube.

A mirror control 32 serves the function of moving the mirror 22 closer to or further away from the mirror 24. Both gross settings as well as very fine servo control adjustments of the distance between the two mirrors 22 and 24, are required. Thus, the mirror positioning device should be of the type which is used for positioning in interferometers. For example, a scanning interferometer which is a commercially available unit with a proper fine control for the mirrors which is suitable for use herein, consists of a mirror mounted on a PZT, electro-active ceramic cylinder which varies in length by the application of an electrical voltage. Two hundred volts is typically applied to cause mirror motion of 0.5 micron-meters.

A review of the theory behind the operation of the system shown in FIG. 1 follows.

Consider a mode-locked laser with unit-amplitude modes spaced by $\omega_c$ rad/sec and centered at $\omega_o$. The TEM-wave emitted has an electric field amplitude given by $$E(t) = \sum_{p=-N}^{N} e^{i(\omega_0 + p\omega_c)t} \quad (1)$$

or in summing the geometric progression, equivalently, by $$E(t) = e^{i\omega_0 t} \frac{\sin\left[(2N+1)\frac{\omega_c t}{2}\right]}{\sin \frac{\omega_c t}{2}} \quad (2)$$

The mode spacing is related to the laser cavity length $L_o$ by $\omega_c = \pi c/L_o$ where $c = 3 \times 10^8$m/s. From Eq. (2), we find the mode-locked laser emits a train of pulses, having the carrier frequency $\omega_o$, and an envelope which peaks sharply periodically at intervals T given by $$T = 2\pi/\omega_c \tag{3}$$

This peak amplitude of (2N+1) volts/m has a half-power duration, $\tau$, given approximately by $$\tau = 2\sqrt{2}/\pi(2N+1)f_c \tag{4}$$

$$\tau = 1/\Delta f$$

where $f_c = \omega_c/2\pi$ and the oscillator total line width $\Delta f \approx (2N+1)f_c$.

The receiver is easiest to explain if it is assumed that the transmitter signal is, as above, unmodulated by an intelligence. However, assume that the transmitter platform approaching the receiver at a constant speed $v$. The receiver shown is as close an approach as is presently practical to the "matched-filter" optimization in the field of communication theory. Technically, it is a "comb-filter," i.e., it has narrow passbands of unity transmissivity for equi-spaced frequencies controlled by selecting L to match an incoming signal, S. In brief it is extremely efficient in rejecting noise, such as sunlight or other ambient optical interference.

The proper choice for L is found from the following consideration. Reducing the relativistic doppler shift formulas for EM-radiation, one finds with $\theta = \theta' = 0$ the display 30 are peaked. The deviation of L from $L_o$ is indicative of the velocity V.

An obvious variation of the basic system shown in FIG. 1 is to have the transmitter and the receiver on a common platform. The mode-locked laser-transmitter is used to illuminate a moving vehicle, which could co-operatively have a tetrahedral reflector. The echo returned is detected before. In this case, as is well known, a vehicle approaching at a speed V will give rise to echo shifted to a frequency $f$ given by $f = f' + 2vf'/c$ where $f'$ is the transmitted frequency. Thus, in equations (6) and (7), the result is as before except that V is replaced by 2V. In case the vehicle does not have a reflector, the echos would of course be much smaller, but still in many cases detectable since the receiver is inherently a sensitive one.

When instead of Doppler type modulation, an intelligence modulated mode-locked laser transmitter is used, the receiver responds essentially in the manner described, except that the detected amplified signal must be demodulated and processed in a manner which is appropriate to the information being transmitted. The band width of such a system is limited roughly to the band width of the passive Fabry-Perot cavity. Present practice is to limit the band width to 1 to 2 MHz in the visible portion of the spectrum using high quality multi-layers on mirrors 22 and 24. It is a simple matter to design a cavity having a larger value of band widths, i.e. 10 – 30 MHz would be reasonable values, if the information band so demanded.

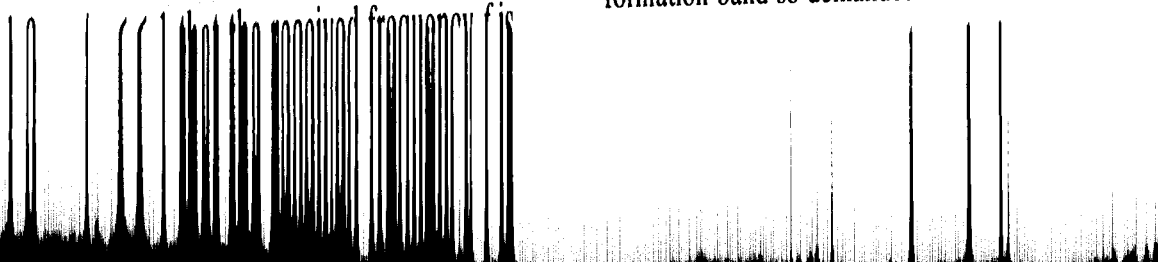

the factor known as the cavity finesse—this is similar to the quality factor Q used by electrical engineers. The cavity finesse $$F = f/\Delta_f = \frac{\text{mode spacing between line center frequencies}}{\text{frequency interval passed with approximate unity transmission}}$$

is 100 to 250 for good practice in the visible region of the spectrum.

Thus, the intelligence modulated, multi-tone laser signal is detected with a signal-to-noise improvement of $F$, typically 100 $x$, if we compare reception with the cavity to that without. This holds true both for the intelligence modulated and the velocity modulated cases. The intelligence detected may be visual or audible. Thus, the display or intelligence reproducer may be a T.V. type display or a loudspeaker or a teletypewriter, etc.

In the design of the Fabry-Perot cavity the mirrors are purposely fabricated with slight transmissions, large almost unity reflectivities and negligible absorption. As is well-known, the energy emitted axially at the output of the two mirrors divided by the energy into the first mirror (this ratio is called the transmissivity $T(\omega)$ as indicated in M. Born and E. Wolf, "Principles of Optics," 4th Edition, 1971, Pergamon Press, Oxford, p. 62 and 327.

$$T(\omega) = \frac{1}{1+F\left[\sin\frac{\omega L}{c}\right]^2} \quad (8)$$

where $$F = 4r^2/(1-r^2)^2 \quad (9)$$

and the reflection coefficient of each mirror is taken equal, $r$, the power transmission of each alone is $t^2 = 1 - r^2$. The full-half-power bandwidth is seen by Eq. (8) to be approximately (bandwidth of good transmission for each tone or mode of the multi-mode laser)

$$\Delta\omega = 2c/L\sqrt{F} \quad (10)$$

and since the mode to mode spacing is $\omega_{mm} = 2\pi (c/2L)$ we can rewrite Eq. (3) as $$F = \omega_{mm}/\Delta\omega \approx \sqrt{F} \quad (11)$$

In the intelligence modulated application, the required intelligence bandwidth, $\Delta\omega$, over which high transmissity is required is known. For a laser of known cavity length, $L_o$, compute the value of $\omega_{mm}$ and, by Eq. (4), the $F$ and the $F$. Substitution of this value for $F$ into Eq. (2) and solving for $r$ specifies the reflectivity for the mirrors of the passive cavity. This summarizes the design of the two-mirror cavity insofar as selecting the reflectivities in order to pass the intelligence bandwidth.

Figure 2:
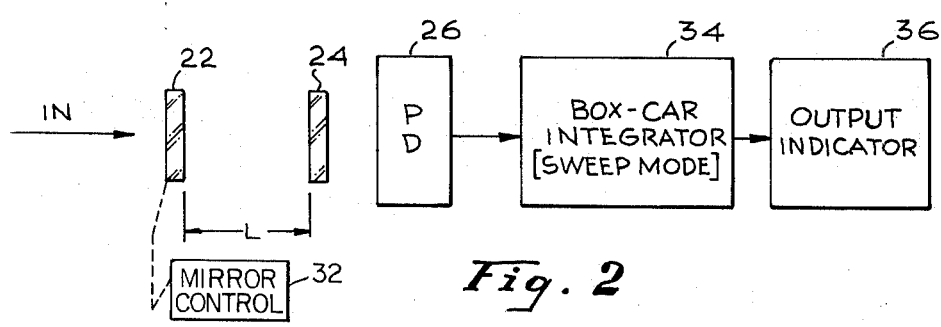
FIG. 2 is a block schematic diagram of another embodiment of the receiver, in accordance with this invention.
Figure 3:
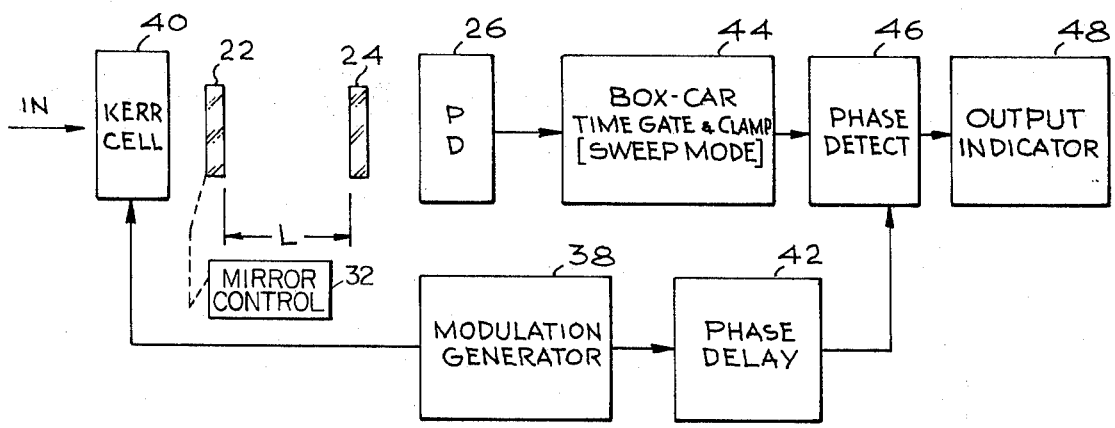
FIG. 3 is a block schematic diagram of still another embodiment of the receiver in accordance with the invention.

Variations in the receiver configuration following the Fabry-Perot cavity may be employed as shown in FIGS. 2 and 3. The cathode ray oscilloscope system shown in FIG. 1 should be a time sampling type which displays a train of pulses, the formula for which is given in the envelope term of equation (6).

More sensitive reception is provided with an arrangement shown in FIG. 2, wherein the photodetector output is applied to a box car clamp 34 followed by temporal integration. This effectively constitutes sensitive detection and amplification of short duration pulses. The output is applied to a suitable type of indicator 36 for detecting peak amplitude. Roughly, the boxcar clamp circuit reduces the noise by a factor of $T/\tau$ where $T$ is the period between pulses of the mode-locked signal (Eq. 3) and $\tau$ is the duration of the short pulse burst (Eq. 4). The integration further improves the signal to noise proportional to the root of the integration time. These improvements are standard in the detection of sensitive electrical signals, and are attributed to Prof. R. H. Dicke. The essence of the improvement in this invention is as a predetection filter where the improvement factor is roughly the same as the cavity finesse — and the point is that these standard post-detection improvements can also be obtained with this invention; in other words, these post-detection methods are all compatible with the use of the passive Fabry-Perot and lead to a further or cascaded improvement. Suitable boxcar-integrator circuit packages are commercially purchasable for example, from Princeton Applied Research Corporation at Princeton, N.J.

If photo detector noise is a limiting factor, or if an active Fabry-Perot cavity is used, then an arrangement as shown in FIG. 3 may be employed. Here, a low frequency source of signals entitled "Modulation Generator 38" has its output applied to a Kerr cell 40, or other light modulator, as well as to a phase delay network 42. The Kerr cell modulates the incoming or received light before it enters the Fabry-Perot cavity established by the two mirrors 22, 24. A photo detector 26 then converts the modulated light into electrical signals. These are applied to the boxcar circuit 44, the output of which is applied to a phase detector 46.

The phase delay network 42 is set to delay the signal from the modulation generator sufficiently so that the modulation applied to the incoming signal by means of the Kerr cell is cancelled by the phase detector. Thus, the output of the phase detector representitive of the incoming light signal is applied to the output indicator 48 for detection for when the distance between the two mirrors 22 and 24 provides a peak signal.

There has accordingly been shown and described herein above a novel, useful laser doppler system, and a useful predetector method of filtering intelligence-modulated signals from a mode-locked laser or from a cavity-dumped laser.

What is claimed is:

1. A receiver for modulated laser light emitted from a source to said receiver comprising
    a filter for excluding light other than the desired laser light, a Fabry-Perot cavity established by the space between two spaced partially reflecting, partially transmitting mirrors, to which the light passing through said filter is applied,
    photo detecting means to which light passing through said Fabry-Perot cavity is applied for converting said light to an electrical signal,
    signal reproducing means to which the output of said photo detecting means is applied, and, means for moving one of said spaced mirrors in said Fabry-Perot cavity with respect to the other until said signal reproducing means indicates that the signal received from said photo detecting means is peaked.

2. A receiver as recited in claim 1 wherein said signal reproducing means includes means for demodulating said electrical signal, transducer means for converting said demodulated signal into visible or audible form.

3. A system as described in claim 2 wherein said means for demodulating said electrical signal includes boxcar integrating means.

4. A system as recited in claim 3 which includes modulation generating means, means for modulating the light being received by said receiver from said transmitter in reponse to the signal output of said modulation generating means, and means connected between said boxcar integrator and said output indicator for cancelling the modulation.

5. A laser doppler shift measuring system comprising a transmitter including a laser light source having a Fabry-Perot cavity of a predetermined length and emitting light toward a relatively moving receiver, said receiver including a filter having a band width for passing substantially only the light from said transmitter, a Fabry-Perot cavity defined by two mirrors spaced from one another, means for moving one of said two mirrors relative to the other, photo detecting means for receiving light passing through said Fabry-Perot cavity and converting it to an electrical signal, means for indicating the electrical signal output of said photo detecting means, and means for moving one of said mirrors with respect to the other until said means for indicating indicates a peaked signal whereby the difference between the length of the transmitter Fabry-Perot cavity and the distance established in the receiver Fabry-Perot cavity between the two mirrors is indicative of the velocity between the transmitter and the receiver.

6. In a system as recited in claim 5 wherein there is included a boxcar integrator means between said photo detector means and said output indicator means.

7. A system as recited in claim 5 wherein there is included means for applying a modulation to the laser light signal which is received by said receiver, and means for removing said modulation at the output of said boxcar integrator circuit.

* * * * *

UNITED STATES PATENT OFFICE
CERTIFICATE OF CORRECTION

Patent No. 3,788,743          Dated January 29, 1974

Inventor(s) Nicholas George

It is certified that error appears in the above-identified patent and that said Letters Patent are hereby corrected as shown below:

Under the ABSTRACT heading, line 8, cancel "A." and instead insert -- $A°$ --.

Column 1, line 15, cancel "the" and instead insert -- for --.

Column 2, line 14, cancel "reciever" both occurences and insert -- receiver --.

Column 2, line 65, cancel "traim" and insert -- train --.

Column 3, line 16, cancel "an" and insert -- any --.

Column 3, formula 5, cancel "$f=f + vf/c$" and insert -- $f=f' + vf'/c$ --.

Column 4, line 51, cancel "returning" and insert -- retuning --.

Column 6, line 46, cancel "representitive" and insert -- representative --.

FORM PO-1050 (10-69)

Page 2

UNITED STATES PATENT OFFICE
CERTIFICATE OF CORRECTION

Patent No. 3,788,743  Dated January 29, 1974

Inventor(s) Nicholas George

It is certified that error appears in the above-identified patent and that said Letters Patent are hereby corrected as shown below:

Column 7, line 26, cancel "saId" and insert -- said --.

Signed and sealed this 3rd day of September 1974.

(SEAL)
Attest:

McCOY M. GIBSON, JR.
Attesting Officer

C. MARSHALL DANN
Commissioner of Patents